United States Patent
Isom et al.

(10) Patent No.: US 7,332,057 B2
(45) Date of Patent: Feb. 19, 2008

(54) METHOD OF VAPORIZING LIQUIDS BY MICROWAVE HEATING

(75) Inventors: Wendell Isom, Grand Island, NY (US);
Prasad Apte, East Amherst, NY (US);
Arthur Edward Holmer, Rensselaerville, NY (US)

(73) Assignee: Praxair Technology, Inc., Danbury, CT (US)

( * ) Notice: Subject to any disclaimer, the term of this patent is extended or adjusted under 35 U.S.C. 154(b) by 262 days.

(21) Appl. No.: 10/344,610

(22) PCT Filed: Dec. 10, 2001

(86) PCT No.: PCT/US01/47196

§ 371 (c)(1),
(2), (4) Date: Aug. 27, 2003

(87) PCT Pub. No.: WO02/47783

PCT Pub. Date: Jun. 20, 2002

(65) Prior Publication Data

US 2004/0035533 A1 Feb. 26, 2004

(51) Int. Cl.
*B01D 1/00* (2006.01)
*B01D 3/42* (2006.01)
*H05B 6/68* (2006.01)

(52) U.S. Cl. ............... 159/47.1; 159/44; 159/DIG. 26; 219/679; 219/702; 203/2; 203/100

(58) Field of Classification Search ............... 159/47.1, 159/44, DIG. 26; 203/1, 2, 100; 219/679, 219/702, 759
See application file for complete search history.

(56) References Cited

U.S. PATENT DOCUMENTS

| | | | | |
|---|---|---|---|---|
| 3,495,648 A * | 2/1970 | Amadon | ........................ | 159/3 |
| 3,577,322 A * | 5/1971 | Nesbitt et al. | ................ | 203/11 |
| 4,313,786 A * | 2/1982 | Smith | ........................ | 159/22 |
| 4,549,053 A * | 10/1985 | Haugh | ........................ | 219/686 |
| 4,671,952 A * | 6/1987 | Masse | ........................ | 423/539 |
| 4,826,575 A * | 5/1989 | Karamian | .................... | 202/176 |
| 5,059,287 A * | 10/1991 | Harkey, Sr. | .................... | 203/1 |
| 5,338,409 A * | 8/1994 | Heierli | ....................... | 202/205 |
| 6,025,580 A * | 2/2000 | Yagi | .......................... | 219/685 |
| 6,166,681 A * | 12/2000 | Meszaros et al. | ........... | 342/124 |
| 6,460,412 B1 * | 10/2002 | Cai et al. | .................. | 73/290 V |
| 2001/0022300 A1 * | 9/2001 | Ushijima et al. | ........... | 219/688 |

* cited by examiner

*Primary Examiner*—Virginia Manoharan
(74) *Attorney, Agent, or Firm*—Iurie A Schwartz

(57) ABSTRACT

This invention is directed to a method for vaporizing a liquid by slowly evaporating the liquid from a liquid phase to a vapor phase below the boiling point of the liquid; and applying an effective amount of microwave power to maintain the slow evaporation of the liquid to produce a purified liquid.

8 Claims, 8 Drawing Sheets

| Temperature | Pressure |
|---|---|
| 60 | 92.9 |
| 61 | 94.9 |
| 62 | 96.9 |
| 63 | 98.9 |
| 64 | 101 |
| 65 | 103.1 |
| 66 | 105.3 |
| 67 | 107.4 |
| 68 | 109.6 |
| 69 | 111.5 |
| 70 | 114.1 |
| 71 | 116.4 |
| 72 | 118.7 |
| 73 | 121 |
| 74 | 123.4 |

Temperature v. Pressure, Ammonia Vapor-Liquid Equilibrium

# METHOD OF VAPORIZING LIQUIDS BY MICROWAVE HEATING

FIELD OF THE INVENTION

This invention is generally related to a method for purifying liquids. More specifically, this invention is related to a method for purifying liquid using microwave energy during the vaporizing process to produce ultra high purity gases.

BACKGROUND OF THE INVENTION

Process gases for use in semiconductor manufacturing facilities are generally supplied through cylinders. In order to meet the increasing demand for high flow rate product and ultra-high purity requirements for these gases, gas producers often use an ultra-high purity bulk vaporizer delivery system to treat polar liquefied compressed gases. In contrast, the proposed invention is an on-site system that uses a microwave source of power to increase and to control the evaporation rate of aqueous polar liquids (such as ammonia). The on-site system is able to provide purification, short response time, and accurately controllable vaporization at very high flow rates (exceeding 1000 liters/min in large volumes for the semiconductor industry). To sustain the vaporization of the polar liquid compound, power must be added to the system to replace the heat that is carried off with the gaseous flow to the customer use point. If this is not done, then, in the case of ammonia, the pressure and the temperature at the gas/liquid interface will drop and the polar liquid's vaporization rate will decrease until the gas-liquid pool eventually sub-cools and the vapor flow decreases to a negligible level.

The on-site vaporization system delivers power though a wave-guide and a quartz window. There is no solid source of contamination because there is no physical contact between the energy source and the polar liquid. As a result, the on-site vaporizer system reduces the amount of impurities that are introduced into the vapor phase, thus adding a purification step.

The impurities that will be excluded from the vapor phase and remain in the liquid pool as a result of liquid evaporation includes Group I, Group II and Group III metals, as well as oxides, carbonates, hydrides and halides of these elements. These impurities, for a conventional ammonia vaporizer involving vaporization using wall heating, come from a number of sources including friction from ammonia valves actuation, thermal expansion and contraction of liquid containers, pressure stretch or expansion on vessel container openings during filling, etc. Moisture is another impurity. Based on vapor-liquid equilibrium data, the concentration of moisture in the liquid phase is approximately 2 to 3 orders of magnitude greater than its concentration in the vapor phase. Careful handling in evaporating the liquid phase to the vapor phase can reduce moisture and other non-volatile residues (NVR) by orders of magnitude.

As illustrated in Table I, the semiconductor industry requires that critical impurities be removed from ammonia or other polar fluid. The critical impurities to be removed include moisture and NVRs such as oils and hydrocarbons. Generally, liquid ammonia feed contains 3,000 ppb moisture and 2,000 ppb NVR and oil. For semiconductor purposes, the invention's objective is to achieve less than 100 ppb moisture and 100 ppb NVR impurity level in ammonia or polar product fluid. Another objective is to achieve less than 5.0 ppb metals impurity level in ammonia or polar product fluid, although, we expect less than 1 ppt metal in the vapor product.

TABLE I

Critical Impurity Levels Before and After Purification

| Impurity | Impurity Level in Feed | Impurity Level in UHP Gaseous Ammonia | |
| --- | --- | --- | --- |
| | | Acceptable | Preferred |
| Moisture | 3,000 ppb | <100 ppb | 10 ppb |
| NVR | 2,000 ppb | <100 ppb | <10 ppb |
| Metals | 5 ppb | <5 ppb | <3 ppb |

A common prior art practice for delivering purified gas is through the vaporizer approach, which uses electrical-resistance heating. The process withdraws polar liquid from a tank and heats it with a heat source from either an internal heater or external band heaters to provide heat in excess of available ambient heat. The vapor then passes through a heat exchanger located within the pool of polar liquid to promote further vaporization it the tank. Conduction and convective heat transfer to the bulk liquid from a line source increases the system response time. The use of immersion heaters or shell and tube heat exchangers promotes nucleus boiling, releasing vapor bubbles from the nucleation sites. Since the nucleation sites on the heating surface are substantially hotter than the bulk liquid vaporization of impurities, such as water, takes place. As temperature gradients and nucleation sites are generated, the agitation level in the bulk liquid is increased. Agitation also increases the mobility of NVR, increasing the chances of allowing passage into the vapor phase. As mentioned, the current invention avoids these problems because there is no physical contact between the power source and the liquid. With no immersion heater or heating through container walls, there are no surface hot spots, nor is there any appreciable attendant liquid agitation. Release and carry over of contaminating impurities is, thus, greatly reduced using the current invention.

U.S. Pat. No. 4,671,952 discloses a process and apparatus for generating sulfur dioxide vapor from contaminated liquid sulfur dioxide. The process uses contaminated liquid sulfur dioxide and subjects it to microwave energy at a frequency of 915, 2450, 5850 or 18000 Mhz for a sufficient period of time to produce sulfur dioxide vapor, collecting the vapor and removing the remaining contaminated liquid sulfur dioxide, The vapor pressure of the sulfur dioxide is 34.4 psig at 70° F. and purity of sulfur dioxide achieved is 98.99%. This patent does not teach or suggest the concept of vaporizing the liquid from the discrete penetration depth from the exposed liquid/vapor interface at the top of the liquid mass. Nor does it teach that this process will produce ultra-high purity vapor product. Certainly, there is no teaching or suggestion for segregating the heated liquid from the bulk liquid.

U.S. Pat. No. 4,285,774 discloses an apparatus that continuously produces concentrated alcohol from beer. A plurality of concentrator cells and a plurality of salvage cells are arranged in a line in side-by-side relation. Beer is supplied to the first upstream concentrator cell through a supply conduit. The beer then flows through passages between adjacent cells in response to the volume of beer reaching a predetermined level in the adjacent upstream cell. A microwave ignition bulb is positioned in each cell to heat the beer and boil or vaporize the alcohol content. The gaseous alcohol serially bubbles through a fluid passage from each concentrator cell to the next adjacent upstream cell until the gaseous alcohol reaches the first concentrator cell where the gaseous alcohol is concentrated and condensed in a column to a liquid solution containing approximately 95% alcohol and approximately 5% water. The alcohol obtained from the dilute, substantially spent beer in the salvage cells is collected and returned to the supply conduit for recycle. This invention purposely boils and vaporizes the alcohol in the liquid beer feed. To contrast, the instant invention avoids vaporizing the bulk of the liquid feed in order to increase the purity level of the gaseous product.

U.S. Pat. No. 5,882,416 discloses a liquid delivery system for delivering a liquid reagent in vaporized form to a chemical vapor deposition reactor. The reactor is arranged in a vapor-receiving relationship to the liquid delivery system. The liquid delivery system includes an elongated vaporization fluid flow passage defined by a longitudinal axis and bounded by an enclosing wall. Vaporization is achieved using a heating element contained within the fluid flow passage transverse to the longitudinal axis for heating the fluid to vaporization. The vaporized liquid is then carried to a chemical vapor deposition reactor.

U.S. Pat. No. 5,846,386 discloses an on-site vaporizer that draws ammonia vapor from a liquid ammonia reservoir. The ammonia vapor then passes through a microfiltration filter, and is then scrubbed using high-pH purified water. Commercial grade ammonia converts to sufficiently high-purity ammonia without the need for conventional column distillation. Liquid ammonia is stored in a reservoir. An external immersion heat source generates vapor from the liquid ammonia supply reservoir. Such vaporization constitutes a single stage distillation, leaving certain solid impurities and high-boiling impurities behind in the liquid phase. The ammonia vapor drawn from the vapor space in the reservoir passes through a microfilter. A pressure regulator controls the flow of the filtered vapor and directs it to a scrubbing column/circulation pump combination and then to either a distillation column, a deionized water dissolving unit for purified liquid product point of use, or to transfer lines for gaseous point of use. The vapor headspace of the reservoir controls the flow rate. A circulation pump is employed in the vaporizer system, which can be a source of metallic impurities.

U.S. Pat. No. 5,523,652 discloses using microwave energy in a dielectric plasma chamber, a pair of vaporizers, a microwave tuning and transmission assembly and a magnetic field generating assembly. The chamber defines an interior region in which a source gas is routed and ionized to form plasma. The microwave tuning and transmission assembly feeds microwave energy to the chamber in the $TE_{10}$ (transverse electric) mode.

None of the prior art is believed to teach or suggest using microwave power to control vaporizing a polar liquid within the thermally segregated penetration depth of the liquid pool and produce ultra high purity gases.

As used herein, "penetration depth" ($P_D$) means the depth of the liquid that is actually heated by the microwave power in this invention.

As used herein, "liquid depth" ($L_D$) means the bulk liquid that is essentially unaffected by the microwave power.

As used herein, "flux" means the power (P) per unit of exposed fluid area ($A_S$) exposed to the microwave energy (expressed in Watts/ft$^2$).

As used herein, "freeboard" means the exposed fluid area exposed to the microwave energy.

As used herein, "ripple" or "disturbance" ($R_D$) means the layer at the top of the penetration depth that has enough movement to start entering into the vapor phase, measured from the top of the crest to the bottom of the trough.

As used herein, "superheat" means the temperature above the boiling point of the liquid and reflects the thermal driving force ($\Delta T$) required to achieve boiling condition for the liquid. As an illustration, if the boiling point is 25 degrees and the liquid is at 29 degrees, then the amount of superheat is 4 degrees.

As used herein, "agitation point" means the point where agitation of the liquid being vaporized begins. It is above the boiling point, the $R_D<0.5"$ and preferably $R_D<0.1"$.

SUMMARY OF THE INVENTION

An aspect of this invention is directed to a method for separating a polar liquid from a liquid and gaseous mixture comprising a) introducing an effective amount of microwave energy at a depth of up to about 30 mm into the liquid below the surface of the liquid; b) controlling the microwave power that is introduced into the liquid to maintain the liquid at a condition substantially below the agitation point of the liquid; c) evaporating the liquid in the presence of the microwave power while maintaining the temperature close to the boiling point of the liquid to form purified vapors; and d) capturing the evaporated purified vapors.

Another aspect of this invention is directed to a method for separating a polar liquid from a liquid and gaseous mixture comprising introducing microwave power at a depth of up to about 30 mm into the liquid below the surface of the liquid to reach the liquid's boiling point; controlling the microwave power to near the boiling point of the liquid; evaporating the liquid in the presence of the microwave energy while maintaining the temperature substantially below the agitation point of the liquid to form purified vapors; and capturing the evaporating purified vapors.

The microwave power is introduced into the liquid to a temperature in the range from about 5° C. below the boiling point of the liquid to about 10° C. above the boiling point by controlling the vapor pressure of the liquid, with the preferred condition being close to the boiling point of the liquid.

The resulting purity of the purified gas is less than 100 ppb of impurities.

BRIEF DESCRIPTION OF THE DRAWINGS

Other objects, features and advantages will occur to those skilled in the art from the following description of preferred embodiments and the accompanying drawings.

DETAILED DESCRIPTION OF THE INVENTION

Figure 1:
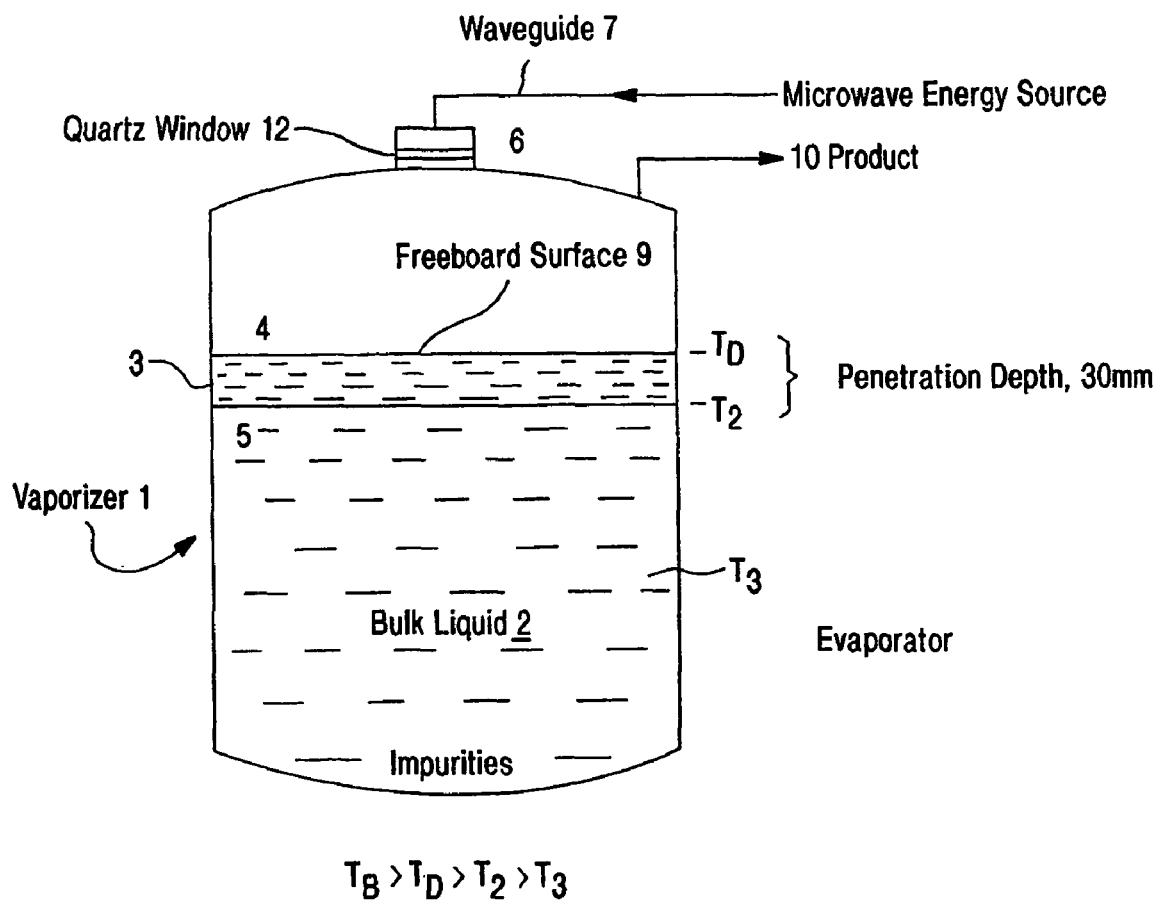
FIG. 1 is a sketch showing the different temperature regions in the vaporizer, 1. The bulk fluid region, 2, is essentially unheated, while the heated region depicted by the penetration depth, 3, is operating closer to the boiling temperature of the fluid. Within the penetration depth there is a temperature gradient. Toward the top of the penetration depth, the fluid is at a higher temperature than at the bottom of the penetration depth, 5. Microwave energy used, to heat the fluid, is introduced into the vaporizer from the top control region, 6, of the vaporizer vessel.
Figure 1A:
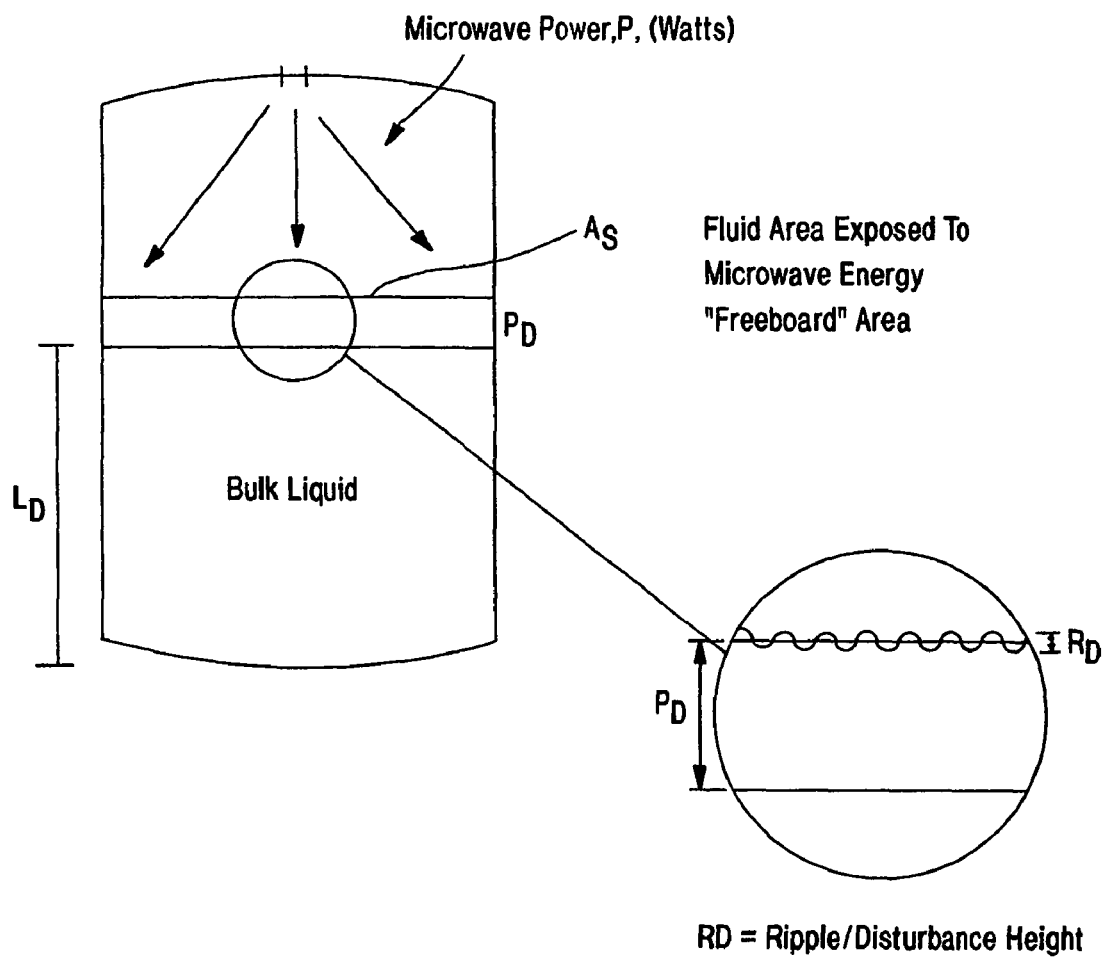
FIG. 1a depicts the ripple or disturbance effect.

This invention uses impure (99.9995% pure or 5 ppm) polar liquid (i.e., ammonia) and adds heat thereto to vaporize the polar liquid while obtaining higher purity (99.99994% or 0.6 ppm or 600 ppb) in the vapor phase. Microwave radiation is used to maintain the temperature of the polar liquid pool within the penetration depth near the boiling point, $T_B$, of the polar liquid at that pressure, FIG. 2. As can be seen from FIG. 2, as temperature of the penetration depth increases the flow rate increases. However, there is also a concurrent increase in impurity level in the vapor phase. Above the agitation point, $T_A$, the vapor phase impurity level increases rapidly. The objective of producing good vaporization flow rate while maintaining relatively low impurity levels in the vapor phase could be achieved by operating the vaporizer with temperature of the liquid in the penetration depth at near $T_B$, but below $T_A$. By operating the vaporizer at temperature essentially below the agitation point, the attendant agitation of the polar liquid is essentially avoided. However, it is preferable to apply sufficient microwave energy to reach the boiling temperature of the polar liquid, and then to adjust the microwave power to achieve a liquid temperature below the agitation point of the polar liquid, but enough microwave energy to vaporize the polar liquid at the defined high flow rate.

The vaporization method in this invention produces higher purity vapor ammonia by evaporating impure using microwave energy. The impurity level of the resulting vapor ammonia is less than about 10 ppm, preferably less than about 5 ppm, and most preferably less than about 1 ppm.

Generally, the vapor impurity level in the resulting vapor ammonia is less than about 3 ppm, preferably less than about 1 ppm, and most preferably less than about 0.2 ppm.

In the practice of this invention, vaporized product is withdrawn from the top of the evaporator, the vapor having a much lower concentration of impurities than that in the liquid phase. The microwave source causes the liquid to evaporate.

Microwave heating of polar liquid is based on the premise that the positive and negative charges are not coincident in space. Consequently, the molecules have a tendency of orienting themselves in response to the electric field. However, the electric field in the microwave region of the electromagnetic spectrum oscillates at a rate that far exceeds the movement of the molecules. This creates an internal resisting force, which interacts with the electric field and generates heat.

A number of microwave frequencies for this type of viscous heating may apply. However, a higher frequency, which lowers the penetration depth, is preferred. A smaller penetration depth localizes the energy and allows for more efficient utilization of energy and less disruption of the volume away from the evaporation point. Further, at 2,450 MHz is the preferred frequency due to the ease of the availability of the equipment and the wave-guide size is small and allows for ease of handling. Nonetheless, other frequencies up to 18,000 MHz can be used. The main criteria is to ensure that just enough internal friction is generated by the electric field of the electromagnetic wave to increase the vapor pressure of the saturated liquid to sustain a required flow rate to the customer. In this invention, 915 MHz is the preferred frequency, 18,000 MHz is the more preferred frequency and 2,450 MHz is the most preferred frequency.

It is believed that this use of microwave energy to purify polar liquid maintains its vapor phase purity at high levels for two reasons. First, minimizing of agitation, which would occur in the system if superheat is kept to a minimum, keeps the impurities in the bulk fluid region towards the bottom of the liquid pool where vaporization is not occurring. Second, with essentially no hot spots, moisture, organic oils, and non-volatile residues will remain in the liquid phase of the polar liquid.

From the available vapor-liquid equilibrium data for the moisture-ammonia system and from available data on moisture concentrations in the liquid and gas phases, it is well known that the concentration of moisture in the liquid phase is at least 2 to 3 orders of magnitude greater than its concentration in the vapor phase at ambient conditions. A similar or greater concentration difference between phases of trace oils and other NVRs has been observed.

This invention provides for a careful vapor phase transfill by substantially preventing the system from the boiling conditions. By maintaining the temperature near the boiling point of the polar liquid, moisture, organic oils and non-volatile residues remain in the liquid phase without transferring into the vapor phase. However, if the polar liquid is allowed to boil with large "superheat" for an extended period, some of the moisture, organic oils and non-volatile residues would be able to transfer (in large concentrations) to the vapor phase by vaporization and agitation, thereby defeating the objective of this invention.

Careful vapor phase transfill can reduce moisture content by two orders of magnitude, i.e., from 100 ppm to less than 10-100 ppb. Higher purification is achieved when the flow rate of the transfill is carried out slowly enough to prevent rapid boiling and high agitation of the liquid ammonia. If significant agitated boiling occurs, the desired purification may not be accomplished, as more of the impurities (moisture) in the bulk liquid get transported in the $P_D$ and enter the gas phase. However, at a low flow, vapor phase transfill will allow the system to maintain the favorable vapor-liquid equilibrium moisture distribution and produce the desired two order of magnitude moisture concentration reduction. A significant reduction in vapor phase oil and NVR concentration will also occur at the same time. Ultimately, the invention is able to produce vapor ammonia with less than 1000 parts per billion, more preferably less than 10 ppb, of impurity levels.

This invention uses microwave energy to provide the heat of vaporization, while substantially maintaining the vapor-liquid equilibrium in the vessel near its boiling point.

Boiling occurs as the evaporated polar liquid is drawn off the top of the vapor fill. As the evaporated liquid is drawn off the top, the vapor pressure decreases. Also, as the polar vapor is drawn off the top of the vapor fill, the temperature of the liquid drops causing the liquid to subcool. The subcooled liquid will spot boil at the reduced vapor pressure. Point 3' of FIG. 3 helps illustrate this point. To prevent spot boiling, the microwave power is increased to provide heat to the subcooled liquid resulting in increased vapor flow and rise in the vapor pressure. This, in turn, reestablishes the vapor-liquid/pressure temperature equilibrium. The equilibrium of the vessel is at a temperature close to the boiling point for that pressure. By reestablishing the appropriate pressure and temperature equilibrium, the invention operates to prevent spot boiling of the polar liquid. Also, this method of operation restores the desired evaporation rate, while maintaining the purity of vaporized ammonia.

The benefits for using microwave energy as a source of heat includes: 1) rapid response to replace the heat of vaporization energy so as to avoid boiling ammonia in liquid pool; 2) absence of particulate contamination; and 3) efficient energy use. Microwave energy sources are very efficient for heating polar substances, where the positive and negative charge centers are separated in space even though the net charge on the molecule is zero. Thus, in polar substances like water or in ammonia, the charge separation enables coupling of the molecules to the energy, thus resulting in heating.

Microwave energy is delivered through wave-guide 7 and quartz window 8 as shown in FIG. 1. There is little or no contamination because the energy is delivered without generating nucleation sites for boiling ammonia or other impurities, such as water.

Microwave energy, when delivered into a tank holding a liquid, will penetrate the liquid to a depth depending on the permittivity, permeability, and microwave mode of operation resulting in heating only the region of the liquid proximate the microwave input to the tank. The liquid depth of penetration decreases as the microwave frequency increases. As the surface recedes by evaporation, further layers get heated. Since the heating element is the liquid itself, when the power is turned off, heating ceases instantly, resulting in a "rapid response".

Volumetric heating produces high efficiency because it does not depend on surface conduction and convention to any great extent. Further, the disturbance (penetration depth) is estimated at less than about 0.25", preferably less than about 0.1". Almost all of the gas reaching the freeboard surface, 9, (FIG. 1) in the tank by evaporation will, accordingly, come from the heat penetration depth ranging from 2.6 mm to 30 mm in our case. The stated freeboard surface is the actual interface between the liquid and vapor phases.

In order to satisfy the need for safe and cost effective bulk source and delivery system, the present invention provides a method and apparatus for delivering ultra high purity polar process gases. The delivery system is an evaporation system capable of sustaining a high flow rate. The evaporation system contains a large quantity of polar saturated liquid chemical product where the chemical has at least a vapor phase and a liquid phase.

One method of operation is to run the process in a batch mode. The polar liquid is allowed to decrease to a certain level, and then turn the microwave off, while the vessel will subsequently be refilled with fresh polar liquid. It is important that the level of bulk liquid does not become too low. The bulk liquid height, $L_D$, should never be smaller than the penetration depth height, $P_D$. Otherwise, the impurities in the bulk liquid region will become too concentrated and may be able to transfer to the vaporized ammonia product.

In addition to batch mode operation, another method of operation is through continuous addition of polar liquid from cylinder 1 (FIG. 1) while the microwave energy is applied.

FIG. 1 depicts the general operation of this invention. Impure feed liquid ammonia is fed to the vaporizer (not shown). The microwave energy source supplies power to the vaporizer system through wave guide 7. The microwave power heats a penetration depth of up to about 30 mm of the top of the liquid ammonia, 3. Below this penetration depth is bulk liquid 2, which is relatively unheated. Relatively unheated means that the bulk liquid is at or above room temperature and significantly below the liquid boiling point, $T_B$.

Figure 3:
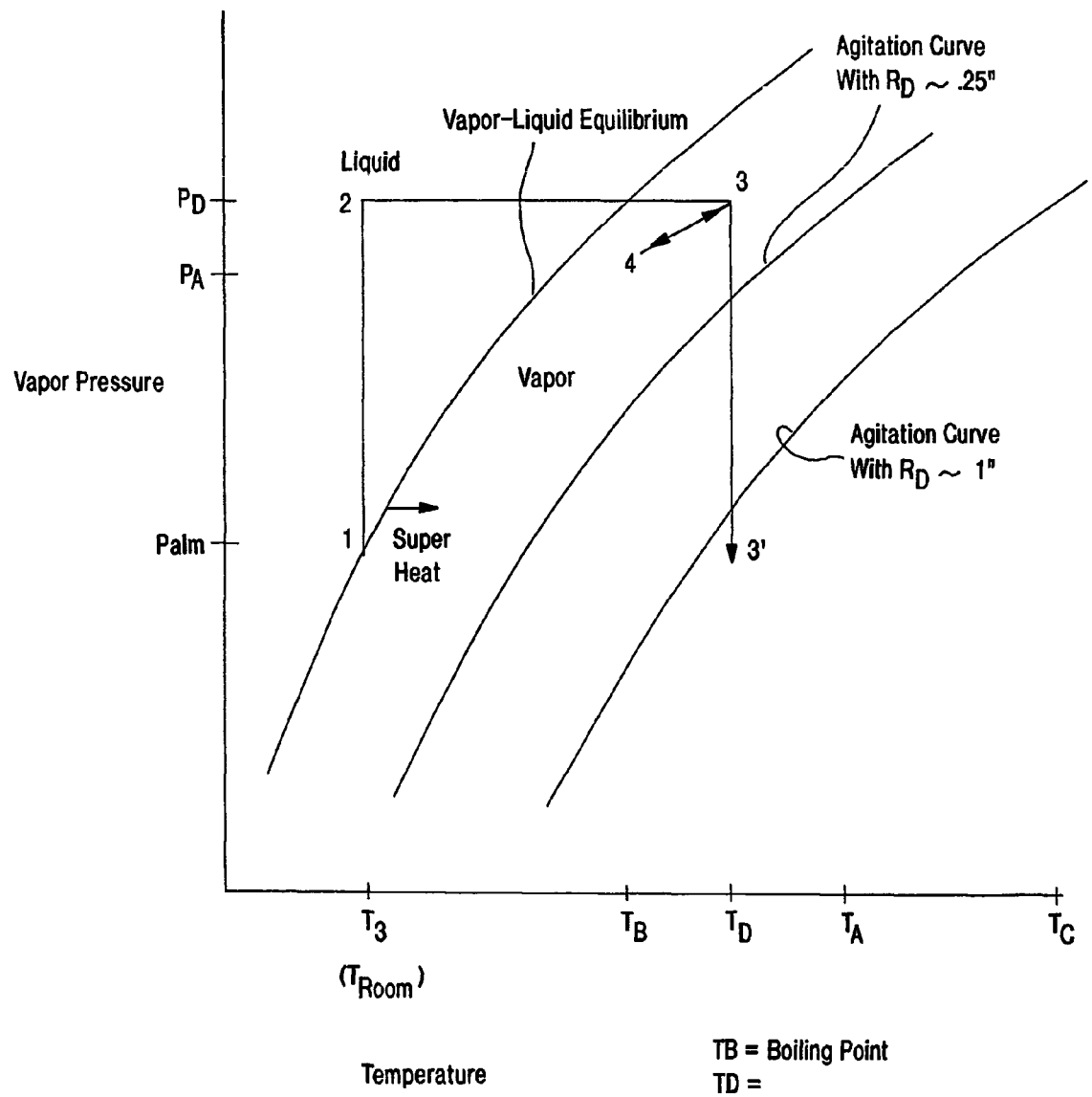
FIG. 3 illustrates the liquid-vapor equilibrium for ammonia, along with the design conditions for the invention.

As the microwave heats the liquid ammonia in the penetration depth 3, the ammonia begins to evaporate. The purified gaseous ammonia 10, is drawn off the vaporizer system. As a result of withdrawing vapor, the vapor pressure of the liquid ammonia begins to drop as does the temperature of the liquid in the penetration depth 3. To prevent spot boiling, microwave power is added to ensure that the liquid temperature in the penetration depth does not drop to a point where the liquid starts to boil at the reduced pressure. Point 3' on FIG. 3 illustrates where the ammonia would be in the event that the pressure drops too quickly. In that case, the ammonia would be too far below the agitation curve and impurities would be allowed to enter the gas product.

The vapor pressure—temperature equilibrium should be maintained such that the system operates at a temperature near the boiling temperature for the vapor pressure that the system operates at. In other words, the power must maintain the system such that it operates near the vapor-liquid equilibrium line. See FIG. 3. This type of operation ensures high enough flow rates without compromising purity.

The primary objectives of this invention are high product flow rates along with high purity. It is known that operating a vaporizer system with high superheat above $T_B$ will give a large flow throughput, along with an increase in the impurity level. If we can accept this increase in impurity, then it is obvious to operate above $T_B$ so as to achieve the high flow through put. This invention is nonobvious because it operates near $T_B$. In this invention, the superheat of liquid ammonia in the penetration depth is maintained at a temperature of less than about 30° F., preferably less than about 20° F., and most preferably less than about 10° F.

Figure 2:
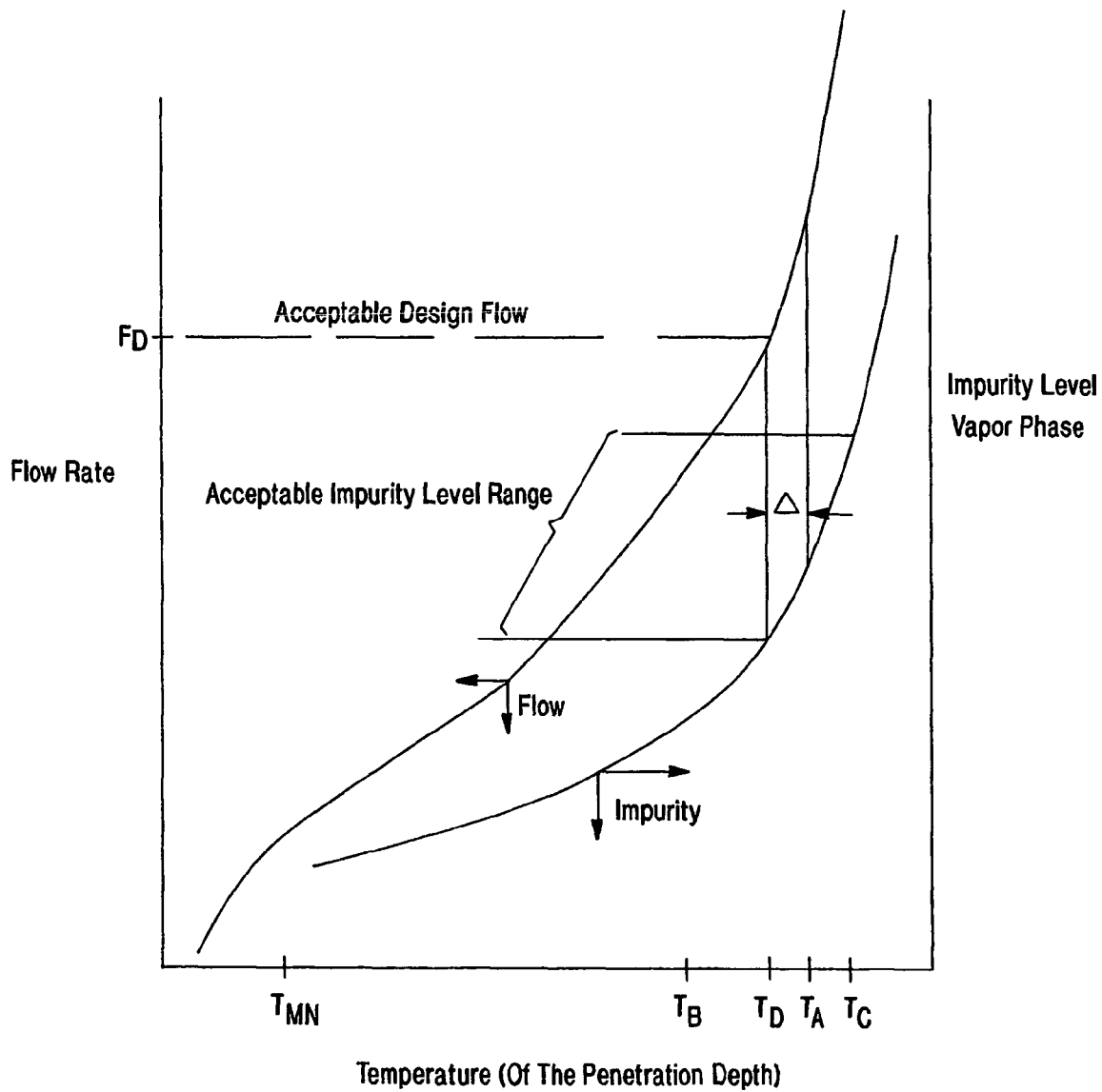
FIG. 2 illustrates the relationship between temperature, $T_{PD}$, and its vapor-phase flow rate in the penetration depth of the polar liquid, as well as the relationship between the temperature and the gas-phase impurity levels. As temperature increases, flow rate increases, along with an increase in impurity level.

FIG. 2 illustrates the concept of flow and impurity as a function of operating temperature. At $T_{min}$ the impurity level of the vapor system is very low. However, the corresponding flow rate of the vapor stream is too low to meet the objectives of the invention, specifically, high flow rates of vapor products.

As the operating temperature increases, the flow rate starts approaching acceptable design levels. Above $T_D$, the design temperature of the fluid in the penetration depth, the impurity levels could increase. As FIG. 2 suggests, $T_D$ is the optimal operating temperature. At $T_A$ the flow rates are sufficiently high. Although the impurity level at this temperature is projected to be higher than at lower temperatures, the impurity level still meets the objectives of the invention. Above $T_C$, the purity level is compromised and not acceptable for the semiconductor industry.

Overall, FIG. 2 illustrates the appropriate trade-off between flow rate and impurity levels. At $T_D$, the system provides acceptable flow rates and impurity levels for the semiconductor industry.

To maintain the desired flow rate of evaporation, power must be added to the system to replace the heat required for vaporization. If this is not done, the temperature of the system will drop, and the rate of evaporation will decrease, and the desired vapor flow will not be achieved. If the vapor draw is still maintained at the high desired level, the vapor pressure will fall and the liquid will begin to boil. As a result, all purification advantage for moisture, oils and NVR will be lost.

A standard evaporator approach using internal or external heaters with agitation tends to promote boiling by generating gradients and nucleation sites. Agitation also increases the mobility of NVR, thereby increasing the chances of passage into the vapor phase.

The current invention uses microwave heating at a controlled power to sustain the evaporation process. An effective amount of microwave power is added to the liquid so that the temperature of the liquid in the penetration depth substantially remains near the boiling temperature of ammonia at the design vapor pressure.

FIG. 3 illustrates the desired operating conditions for the vaporizer system. The system will be designed to operate within the design pressure and temperature parameters, $P_D$ and $T_D$, respectively. Note that $T_D$ is near the boiling temperature, $T_B$, which corresponds to the saturated pressure, $P_D$. A cycle of the operating conditions will now be discussed. At the beginning of the cycle, the system is at about room temperature ($T_3$) and at atmospheric pressure (Patm). This is illustrated by point 1, FIG. 3. As microwave power is added, the penetration depth is heated. The penetration depth is the top layer (up to 30 mm) of the liquid that is actually heated by the addition of microwave energy. Also, as microwave power is added, the temperature and pressure of the penetration depth increases. In this way the design temperature, $T_D$, and the design pressure, $P_D$, are reached. This is illustrated as point 3 on the diagram. Upon reaching the design pressure and temperature, the liquid evaporation rate begins to increase. At the bottom of the penetration depth, the temperature is slightly below $T_D$. The temperature here corresponds to $T_2$, from FIG. 1. The vapor leaves the liquid at the freeboard, which is the interface between the vapor and the liquid. At a higher vapor demand rate, the vapor flows out of the system at a faster rate, resulting in a decrease in the vapor pressure of the system. A large decrease in vapor pressure could cause the liquid to become too agitated at the design temperature of $T_D$. To prevent this, microwave power is increased, which raises the liquid temperature above $T_D$, resulting in increased evaporation of the fluid as desired.

Another result of the increased vapor flow, without increasing the microwave power, is a concurrent temperature drop in the penetration depth. As the liquid turns to vapor, the liquid left behind is subcooled below $T_D$, resulting in a decrease in flow. This is numeral 4 on FIG. 3. To prevent the temperature and pressure from going below the minimums of $P_L$ and $T_L$, microwave power is increased. This raises the liquid temperature and vapor pressure to $T_D$ and $P_D$ as indicated by numeral 3 on FIG. 3. The microwave power is able to restore the temperature in the penetration depth. As a result, the vapor pressure-temperature equilibrium is restored and the cycle starts over. Overall, the invention maintains the pressure and temperature below the vapor-liquid equilibrium curve, but tries to maintain the pressure and temperature below the agitation curve having $R_D$ around 1.0".

Figure 4:
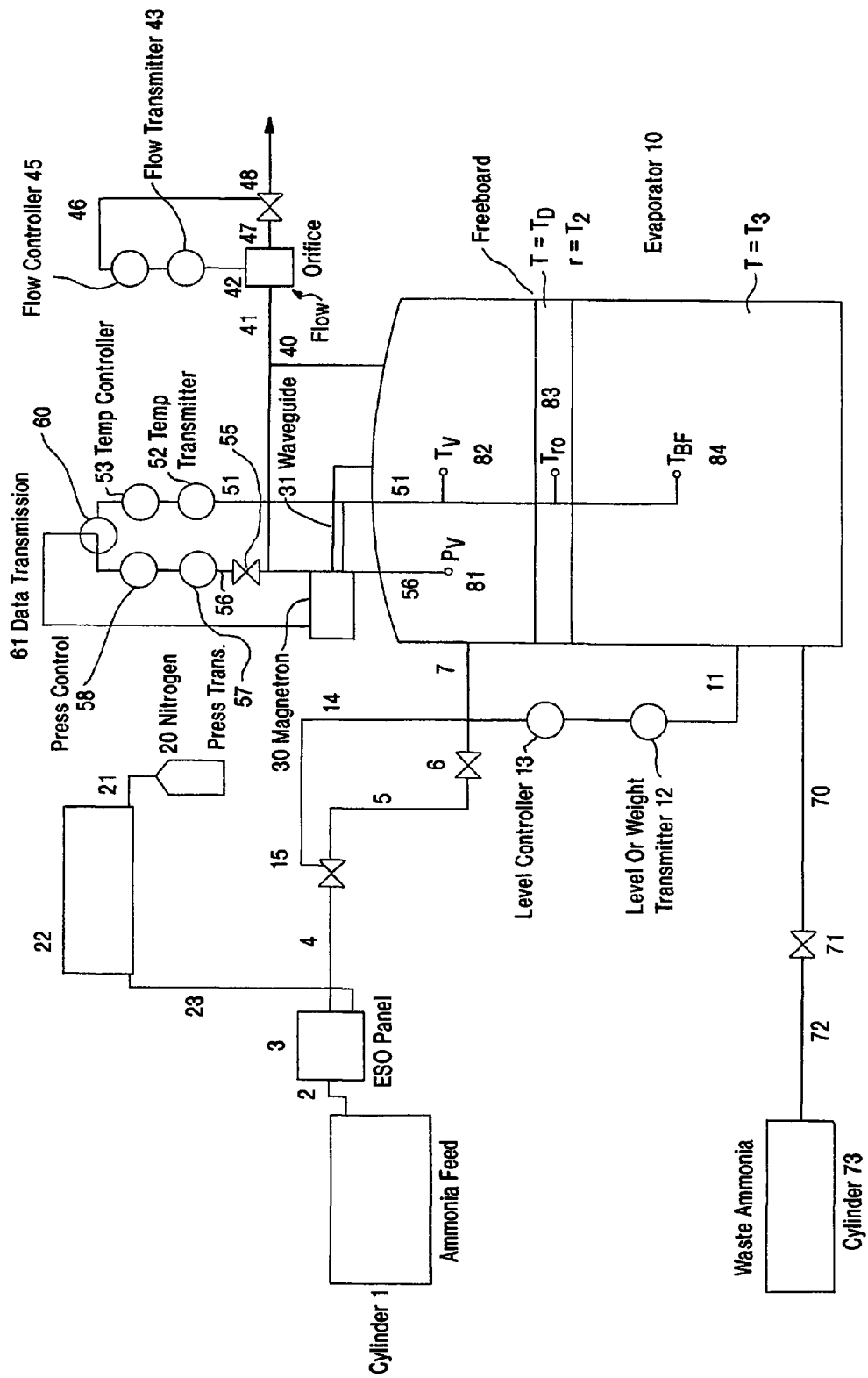
FIG. 4 provides a schematic diagram of the storage, evaporation, control, and delivery method in this invention.
Figure 5:
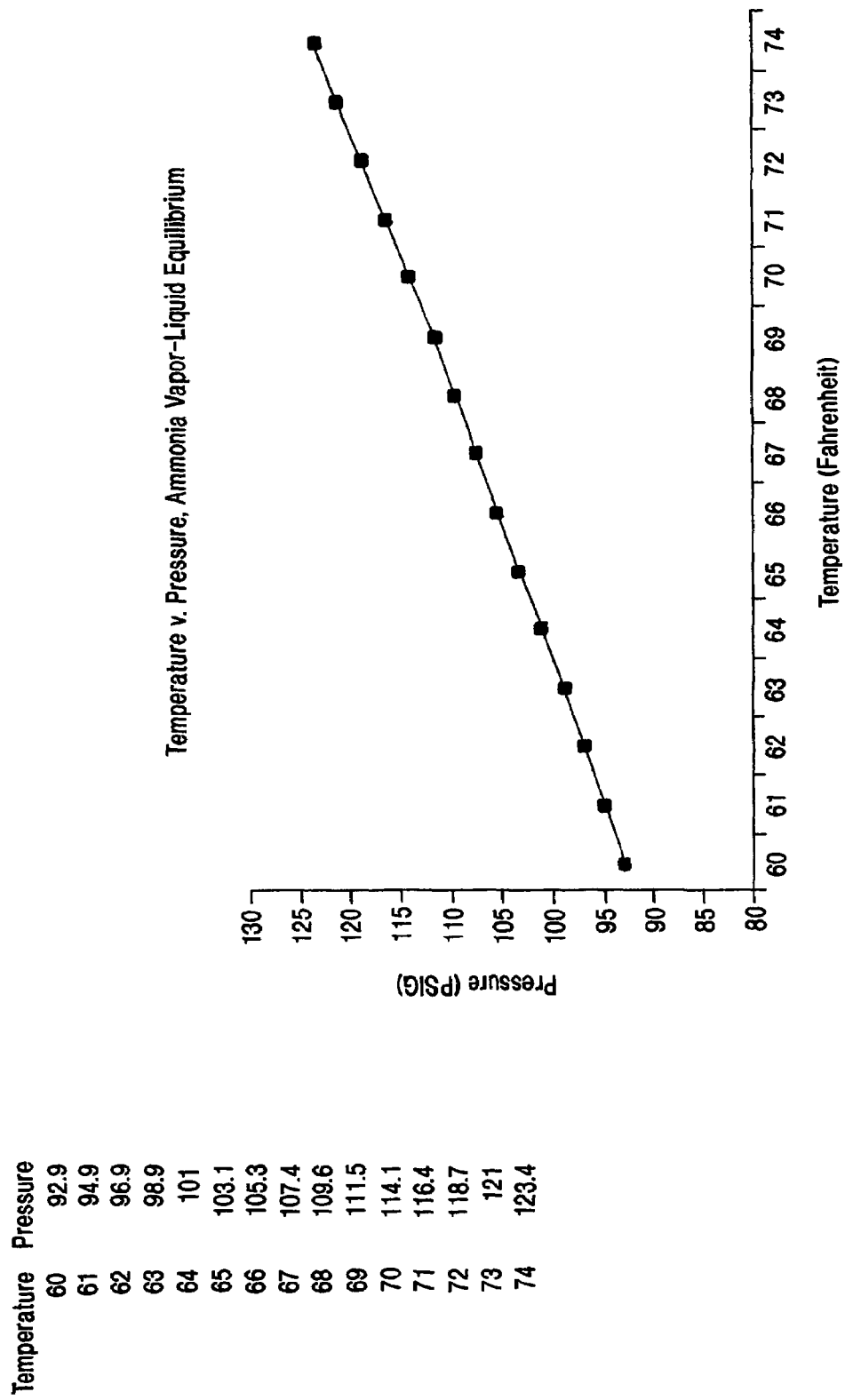
FIG. 5 is the vapor-liquid equilibrium curve for ammonia.
Figure 6:
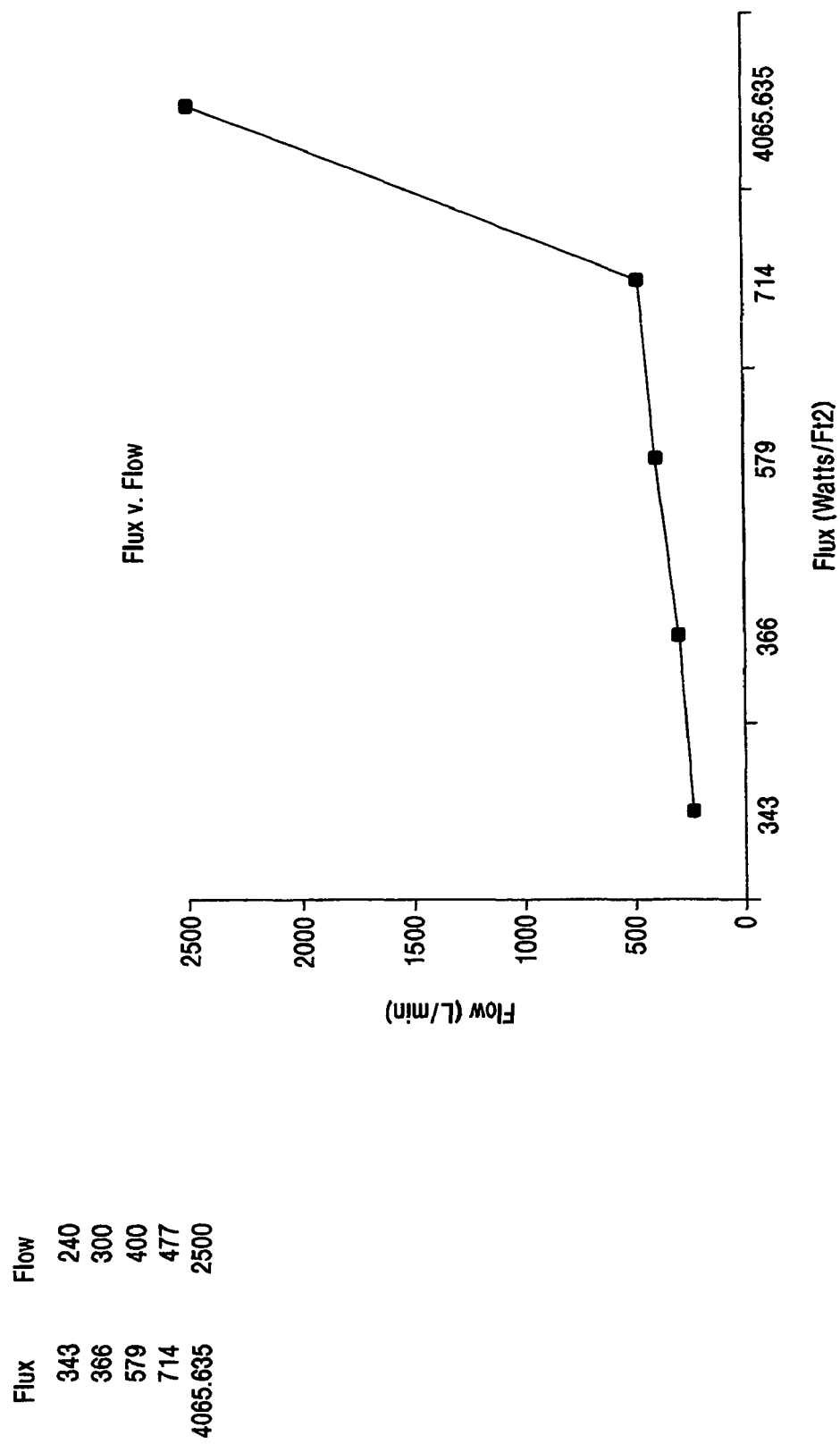
FIG. 6 is a diagram illustrating flow as a function of flux. Flux is the input of watts per heated area.
Figure 7:
FIG. 7 shows that impurity decreases as a function of time. This figure suggests that after about 1 hour, the impurity stabilizes and reaches a bottom plateau.
Figure 7:
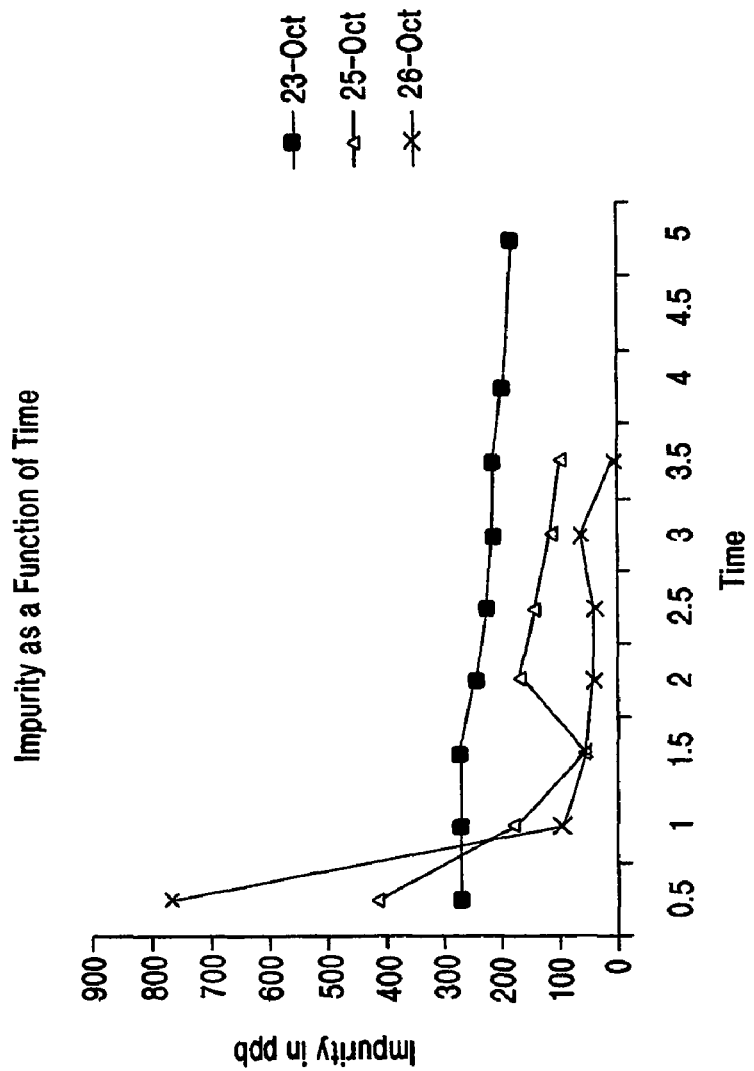

FIG. 4 illustrates the overall microwave vaporizer scheme for the present invention. Cylinder 1 supplies the evaporator 10 with impure feed ammonia via line 7. First, feed stream 2 goes through an ESO (emergency shut off) panel 3, resulting in stream 4. As long as valve 15 is open, feed continues as stream 5 through valve 6, and enters the evaporator 10 as stream 7. The cylinder feeds to evaporator 10 to a set level.

Line 11 transmits the level or weight transmitter 12 of the specific level of ammonia. This information is sent to the level controller 13, which controls (via line 14) valve 15 to modulate the ammonia feed flow. If the ammonia level in the tank is too low, the valve opens allowing ammonia liquid feed to fill the tank. If there is enough ammonia, the valve closes.

In the event that the system needs to be purged, nitrogen tank 20 feeds purge gas panel 22 via line 21. The nitrogen is then fed to ESO panel 3 via purge line 23. Purging with nitrogen and inerts ensures that the vaporizer system is dry.

Once the evaporator is suitably filled, the microwave power is supplied by turning on magnetron 30. The microwave power supply and magnetron 30 is turned on when the product ammonia flow is required. The microwave unit is capable of supplying a high number of watts and its duty cycle is controlled by the combination of a reverse acting pressure controller 58 and reverse acting temperature controller 53 via a line 61. The pressure and temperature controllers are located inside of the ammonia tank, 81, 82, 83, and 84. The microwave power supply and magnetron operate at 2.45 Ghz or any suitable frequency in the microwave region of the electromagnetic spectrum.

Single-mode microwaves generated by magnetron 30 conducted down wave guide 31 are introduced into the evaporator by way of a specially designed safety docking collar 32.

The incident wave, from the microwave, that approaches the plane vapor-liquid interface between the two phases result in a transmitted wave in the liquid media and a reflected wave in a vapor media. Ammonia is a dielectric; therefore, the electric field and magnetic field depth of penetration into liquid ammonia will be limited. Under the above descriptions of operation the penetration depth is from about 16 mm to about 20 mm below the freeboard surface at a temperature of about 20° C. Upon heating, about 16 mm to about 20 mm layers of ammonia below the freeboard will evaporate. Product vapor is withdrawn through flow orifice 42 and flow limit control valve 47, which is controlled by reverse acting flow controller 45. The current invention provides the product flow to customer battery limits at a rate of up to 2,500 gaseous cc/min. The average power input is between 200 and 4,500 Watts/ft$^2$. In the case of ammonia, the microwave energy flux used is from about 0.3 to about 10 watt/in$^2$, preferably from about 0.3 to about 20 watt/in$^2$, and most preferably from about 0.3 to about 30 watt/in$^2$. This is accomplished by maintaining the thermal equilibrium between the liquid vapor phase. The PID (proportional integral derivative) control loops which controls the microwave power can rapidly respond to the need for maintaining steady vapor pressure by replenishing heat to the system, lost by the high flow rate of the product.

Gaseous ammonia flows from the ammonia tank. Line 40 flows through flow orifice 42, which flows through flow limit control valve to produce ultra-high purity gaseous ammonia product stream 48. At the same time, flow transmitter 43 measures the flow through flow orifice 42. The transmitter informs the flow controller of the flow level. Flow transmitter information is passed onto flow controller 45, which instructs the flow limit control valve to open or close.

Information regarding temperature and pressure are read at the top of the ammonia tank. Temperature information is transmitted to temperature transmitter via line 51. Meanwhile, pressure information is transmitted to pressure transmitter via line 56. Although displayed externally, the temperature transmitters and pressure transmitters are actually located inside of the system. The transmitters are located above the freeboard. The temperature transmitter and pressure transmitter transduce the information into a signal recognizable by the temperature controller, 53, and pressure controller, 58. Temperature and pressure controllers 53 and 58 feed their information to low select, 60, which instructs (via line 61) the magnetron how much microwave power is required to restore equilibrium. With increased product flow, the vapor pressure, $P_V$, falls which, in turn causes an increase in the microwave power. Consequently, as the temperature, $T_{PD}$, in the penetration depth increases, the microwave power is reduced, which in turn reduces the vapor pressure and the cycle of power control continues.

The pressure controller, temperature controller and low select comprise a universal controller. The low select, 60, determines whether the magnetron, 30, should be on or off. Low select 60 operates by selecting the lowest relative value between temperature and pressure. To illustrate, if the pressure level is relatively lower than the temperature level, then the low select, 60, will "low-select" the pressure level and disregard the temperature inputs (as long as the temperature is not too high). Low select 60 will recognize that pressure is falling and then the magnetron will be instructed to turn on, via line 61. In the event that the pressure is the low selected signal, but is not below design parameters, line 61 will instruct the magnetron to stay off. The above description will also work in the event that temperature was the low-selected signal.

As the amount of liquid in the tank decreases due to evaporation the impurities in the bulk liquid increases. When the impurity levels become too high, the waste liquid is removed from the tank. Ammonia is drawn off through line 70, through valve 71, forming stream 72, which is stored in waste cylinder 73.

This invention is operable in the operational at a pressure between about 115 to about 120 psig, and at a temperature of between about 18° C. to about 21° C.

This invention may be operated using any polar saturated liquids, however, for purposes of this invention, particularly interested saturated liquid may include, but are not limited by $NH_3$, HF, $SiHCl_3$, $SiH_2Cl_2$, $C_4H_8$, $C_3F_8$, HBr, $C_5Fe$, $ClF_3$, TEOS and the like. The frequency chosen for this device is 915, 2450, 5850, and 18000 MHz. Flow rates from 1 to 2,500 l/min or higher can be achieved by this process with moisture and NVR levels less than about 1 ppm. Contaminants that remain in the liquid pool can be continuously dumped with continuous filling or periodic dump. The system's performance is optimized by integrating a geometric shape with multiple magnetrons located surrounding liquid volume on a specially designed shape. This may reduce the number of microwave interference pattern than can create spot focusing and uneven heating.

Specific features of the invention are shown in one or more of the drawings for convenience only, as each feature may be combined with other features in accordance with the invention. Alternative embodiments will be recognized by those skilled in the art and are intended to be included within the scope of the claims.

The invention claimed is:

1. A method for separating a polar ammonia liquid comprising
    a) introducing an effective amount of microwave energy at a depth ranging from 2.6 mm to 30 mm into a top layer of the liquid;
    b) controlling the microwave energy that is introduced into the top layer of the liquid to maintain a temperature below the boiling point of the top layer of liquid;
    c) evaporating the top layer of liquid in the presence of the microwave energy while sustaining the temperature below the boiling point of the liquid to form purified vapors; and
    d) capturing the evaporated purified vapors.

2. The method of claim 1 comprising controlling the vapor pressure of the liquid.

3. The method of claim 1 further comprising applying microwave energy at a frequency between 915 MHz to 18000 MHz.

4. The method of claim 1 maintaining the microwave energy that is introduced into the liquid to evaporate the liquid at a flow rate between 1 to 1000 l/min.

5. A method for separating a polar ammonia liquid comprising
    a) introducing microwave energy at a depth of ranging from 2.6 mm to 30 mm into a top layer of the liquid to reach the top layer's boiling point;
    b) controlling the microwave energy to near the boiling point of the top layer;
    c) evaporating the top layer of liquid in the presence of the microwave energy while sustaining the temperature below the boiling point of the bulk liquid disposed underneath the top layer of liquid to form purified vapors; and
    d) capturing the evaporated purified vapors.

6. The method of claim 5 comprising controlling the vapor pressure of the liquid.

7. The method of claim 5 further comprising applying microwave energy at a frequency between 915 MHz to 18000 MHz.

8. The method of claim 5 comprising maintaining the microwave energy that is introduced into the liquid to evaporate the liquid at a flow rate between 1 to 1000 l/min.

* * * * *